United States Patent
Genty et al.

(12) 
(10) Patent No.: US 6,738,910 B1
(45) Date of Patent: May 18, 2004

(54) MANUAL VIRTUAL PRIVATE NETWORK INTERNET SNOOP AVOIDER

(75) Inventors: Denise Marie Genty, Austin, TX (US); Gerald Francis McBrearty, Austin, TX (US); Shawn Patrick Mullen, Buda, TX (US); Johnny Meng-Han Shieh, Austin, TX (US); Ramachandran Unnikrishnan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/428,401

(22) Filed: Oct. 28, 1999

(51) Int. Cl.[7] .................................................. G06F 1/24
(52) U.S. Cl. ........................ 713/201; 713/200; 713/164; 713/166
(58) Field of Search ................................. 713/201, 200, 713/164, 166

(56) References Cited

U.S. PATENT DOCUMENTS 6,195,705 B1 * 2/2001 Leung .......................... 709/245
6,430,698 B1 * 8/2002 Khalil et al. .................... 714/4

* cited by examiner

Primary Examiner—Thomas R. Peeso
(74) Attorney, Agent, or Firm—Winstead Sechrest & Minick P.C.; Cynthia Byrd

(57) ABSTRACT

Disclosed is a system and method for enhancing the security and reliability of virtual private network (VPN) connections by manually exchanging secondary configuration information. If a compromise is detected on a main VPN tunnel, a new VPN tunnel can be created by the system administrators using the secondary configuration, stymieing attempted security violations and providing nearly continuous service to the users. A compromise may be indicative of a security breach or other problem with the VPN. The main VPN tunnel may be abandoned or fed with false data to confuse would-be intruders if the compromise is a security compromise.

35 Claims, 7 Drawing Sheets

MANUAL VIRTUAL PRIVATE NETWORK INTERNET SNOOP AVOIDER

CROSS-REFERENCE TO RELATED APPLICATION

This application relates to United States patent application, Ser. No. 09/428,400, entitled "Automatic Virtual Private Network Internet Snoop Avoider", filed contemporaneously herewith.

TECHNICAL FIELD

The present invention relates in general to networked data processing systems, and in particular to virtual private network (VPN) systems and other network systems using tunneling or encapsulating methods.

BACKGROUND INFORMATION

A virtual private network (VPN) is an extension of a private intranet network across a public network, such as the Internet, creating a secure private connection. This effect is achieved through an encrypted private tunnel, as described below. A VPN securely conveys information across the Internet connecting remote users, branch offices, and business partners into an extended corporate network.

Tunneling, or encapsulation, is a common technique in packet-switched networks. A packet from a first protocol is "wrapped" in a second packet from a second protocol. That is, a new header from a second protocol is attached to the first packet. The entire first packet becomes the payload of the second one. Tunneling is frequently used to carry traffic of one protocol over a network that does not support that protocol directly. For example, a Network Basic Input/Output System (NetBIOS) packet or Internet Packet exchange (IPX) packet can be encapsulated in an Internet Protocol (IP) packet to carry it over a Transmission Control Protocol/Internet Protocol (TCP/IP) network. If the encapsulated first packet is encrypted, an intruder or hacker will have difficulty figuring out the true destination address of the first packet and the first packet's data contents.

The use of VPNs raises several security concerns beyond those that were present in traditional corporate intranet networks. A end-to-end data path might contain several machines not under the control of the corporation, for example, the Internet Service Provider (ISP) access computer, a dial-in segment, and the routers within the Internet. The path may also contain a security gateway, such as a firewall or router, that is located at the boundary between an internal segment and an external segment. The data path may also contain an internal segment which serves as a host or router, carrying a mix of intra-company and inter-company traffic. Commonly, the data path will include external segments, such as the Internet, which will carry traffic not only from the company network but also from other sources.

In this heterogeneous environment, there are many opportunities to eavesdrop, to change a datagram's contents, to mount denial-of-service (DOS) attacks, or to alter a datagram's destination address. Current encryption algorithms are not perfect, and even encrypted packets can be read given sufficient time. The use of a VPN within this environment gives a would-be intruder or hacker a fixed target to focus upon in that the end points of the VPN do not change, nor do the encryption methods and keys. Also, the heterogeneous environment is subject to technological breakdowns and corruptions. The instant invention addresses the compromise concerns inherent in this system.

SUMMARY OF THE INVENTION

The instant invention is an apparatus and method for manual negotiation of a secondary configuration of a VPN tunnel for use in case the main VPN tunnel is compromised. Configuration features such as the source and destination addresses of the nodes, the source and destination encryption keys, and the encryption algorithm are exchanged by system administrators in order to establish a main VPN tunnel. In the instant invention, one or more secondary sets of this configuration data are exchanged between the nodes by system administrators in anticipation of a compromise of the main VPN tunnel. In an alternate embodiment, one or more secondary sets of configuration data may be exchanged out-of-band (e.g. via secure telephone) following a compromise of the main VPN or tunneled network. The nodes may take advantage of one of these secondary configurations, should a compromise or attempted compromise be detected.

A compromise of the main VPN tunnel may be detected through any one of several means known in the art, such as an alert from a server. A compromise may be a security breach or a technological breakdown. The system administrators are alerted to the main VPN tunnel compromise and can use previously-exchanged secondary configuration data or can communicate out-of-band (e.g. a secure telephone) to agree on the secondary configuration data (IP addresses, encryption method, encryption keys) and other administrative details (such as time to switch). In the instant invention, the secondary configurations exchanged between the nodes can be used to establish a second VPN tunnel. The second VPN may be established concurrently with the main VPN by "aliasing" multiple IP addresses to the same interface. Alternately, the secondary VPN may replace the main VPN. The main VPN or tunneled network may be abandoned or fed with false data.

The foregoing outlines broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

In the following description, numerous specific details are set forth such as protocol of network transmission, specific networks (e.g. the Internet) byte lengths, addresses, etc., to provide a thorough understanding of the invention. However, it will be obvious to those skilled in the art that the present invention may be practiced without such specific details. In other instances, well-known circuits, computer equipment, or network facilities have been shown in block diagram form in order to not obscure the present invention in unnecessary detail. For the most part, details concerning timing considerations, specific equipment used, encryption methods used, and the like have been omitted in as much as these details are not necessary to obtain a complete understanding of the present invention and are within the skills of persons of ordinary skill in the art.

Within the context of this description, the term "node" is intended to encompass a processing machine, such as a computer, or group of processing machines or computers, such as a local area network (LAN) or wide area network (WAN), which are electrically attached to a network system. Therefore, a "node", as used in this context, may encompass without limitation a single computer, a LAN of computers with a gateway, or a WAN of LANs with several gateways and routers. It is intended that the processing features described and attributed to a node could therefore be accomplished by a single computer, one or more computers, gateways or routers within a LAN, or one or more computers, gateways or routers within a WAN.

Within the context of this patent, the term "VPN" is intended to mean a virtual private network or any other encapsulated or tunneled networking protocol.

Figure 1:
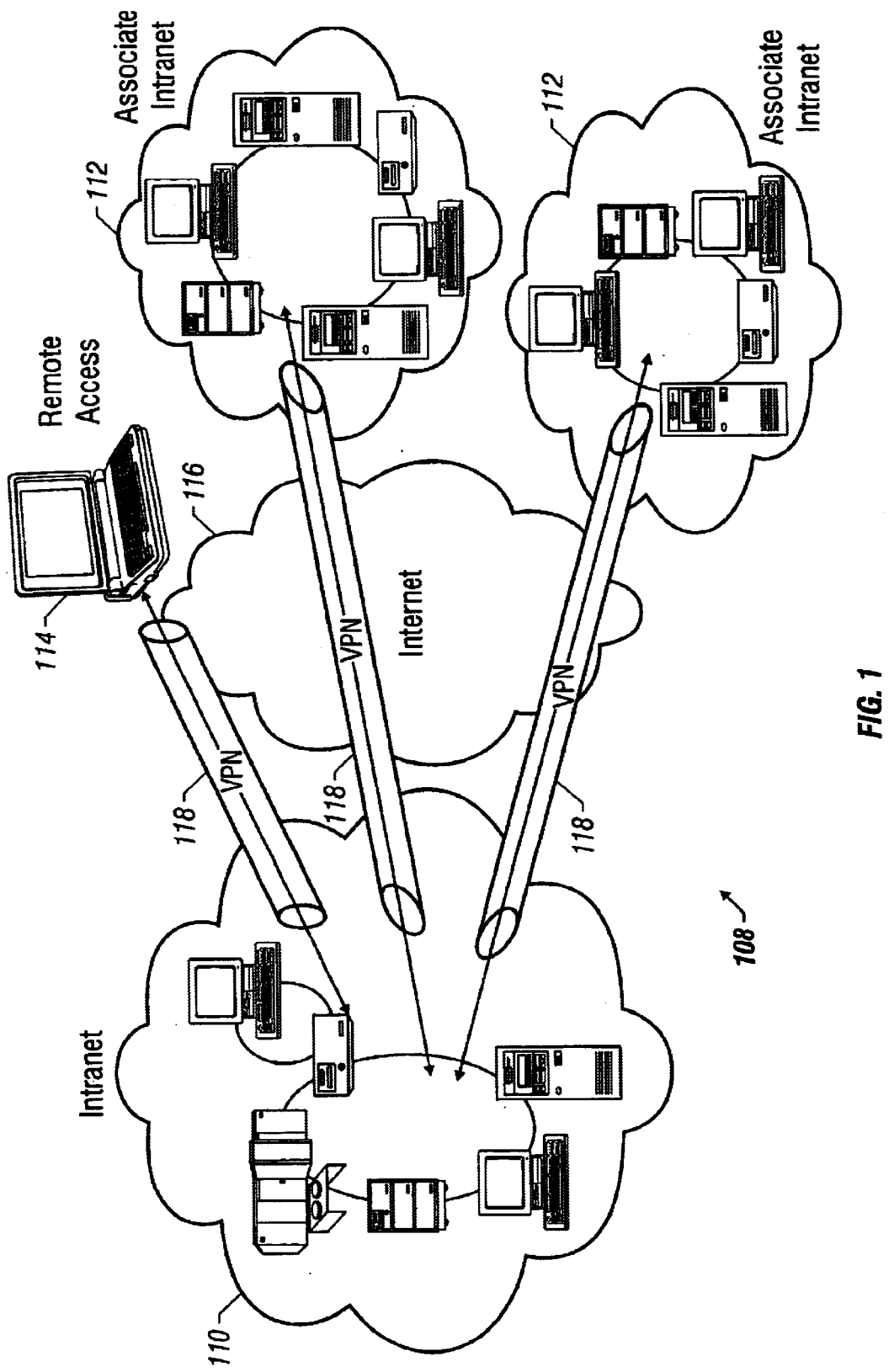
FIG. 1 is a system block diagram of a VPN network system.

FIG. 1 depicts a VPN network system 108. An intranet 110 is a system of networked computers within an organization using one or more network protocols among them for communication. An intranet 110 may be comprised of one or more local area networks (LAN), wide area networks (WAN), or a combination of the two. Oftentimes, an associate intranet 112 will need to be connected to the intranet 110. The associate intranet 112 may be comprised of computers used by business partners, suppliers, or branch offices, for example. The associate intranet 112 may also be comprised of LANs, WANs, or a combination of the two. An individual may also need to access the intranet 110 remotely, through a remote access machine 114.

In a situation where the associate intranet 112 or the remote access machine 114 are not directly connected to the intranet 110, a system may be configured using the Internet 116 or other non-secure network to electrically connect the intranet 110 to the associate intranet 112 and the remote access machine 114. In such a situation, the intranet 110, the associate intranet 112, and the remote access machine 114 all become nodes on the Internet 116.

It is well-appreciated within the art that the Internet 116 is comprised of a series of machines networked using a TCP/IP network protocol. While the TCP/IP network presents a universal protocol which permits a wide variety of machines to connect to the Internet 116, it, like several other protocols, raises a great many security issues. Transmissions over the Internet 116 are not secure and are subject to eavesdropping, denial-of-service (DOS) attacks, snooping, and a variety of other security problems. Accordingly, it is commonly recognized as unsafe to transmit very sensitive data over the Internet 116 without some precaution in the form of encryption. Security concerns are increased whenever consistent and systematic communications are made over the Internet 116, such as those that would be required to maintain a network connection between the intranet 110 and associate intranet 112 or remote access machine 114.

Those skilled in the art will recognize virtual private networking (VPN) as a partial solution to these problems which currently exist in the art. A VPN tunnel 118 can be defined between the intranet 110 and the associate intranets 112 or the remote access machines 114. Each of the intranet 110, the associate intranets 112, and the remote access machines 114 then become nodes to the VPN tunnel as well as to the Internet 116. The VPN tunnel 118 provides an encrypted facility through the Internet 116, through which data may pass between the intranet 110 and the associate intranet 112 or remote access machine 114.

Figure 2:
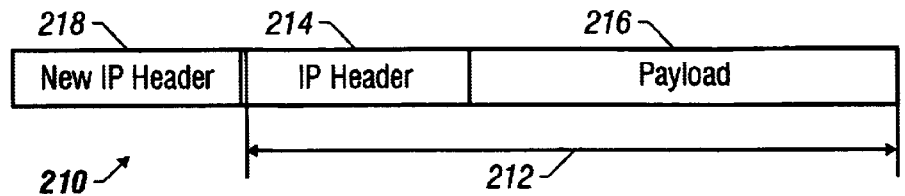
FIG. 2 is a block diagram of a packet conforming to a VPN tunnel protocol.

The VPN tunnel 118 utilizes encapsulated packets to transmit data from a source machine to a destination machine. A encapsulated packet for transmission through the VPN tunnel 118 is illustrated in FIG. 2. An intranet packet 212 will consist of an IP header 214 and a payload 216. The IP header 214 is characteristic of a TCP/IP protocol, but those skilled in the art will recognize that such an encapsulation technique is frequently applied to other networking protocols within the art. The IP header 214 contains information such as the address of the source machine, the address of the destination machine, and other administrative data. The payload 216, on the other hand, contains the data to be transmitted from the source machine to the destination machine. In a VPN tunnel system, the original packet 212 is preceded by a new IP header 218. The new IP header 218 contains the same type of administrative information contained in the IP header 214, however, the administrative information in the new IP header 218 is such to communicate the entire packet from the beginning point to the end point of the VPN tunnel 118. Frequently the entire encapsulated packet 212 is encrypted before the new IP Header 218 is attached. In this way, a party who intercepts the tunneled packet cannot easily obtain any of the information from the original packet 212.

Figure 3:
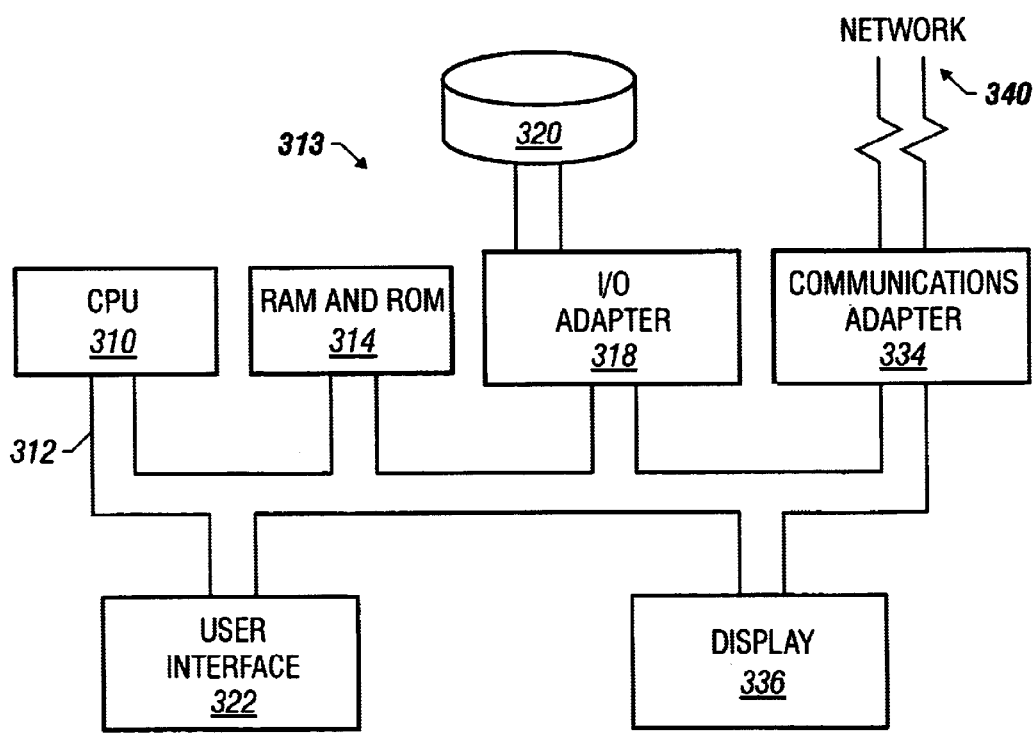
FIG. 3 is a block diagram of a computer used within a VPN system.

A representative hardware environment for practicing the present invention is depicted in FIG. 3, which illustrates a hardware configuration of a data processing system 313 in accordance with the subject invention having a central processing unit (CPU) 310, such as a conventional microprocessor and a number of other units interconnected via a system bus 312. System 313 includes memory 314, consisting of random access memory (RAM) and read only memory (ROM). System 313 also includes an input/output (I/O) adapter 318 for connecting peripheral devices such as disk units 320 to the bus 312, a user interface 322 for connecting a keyboard, mouse, and/or other user interface devices (not shown) to the bus 312, a communication adapter 334 for connecting the system 313 to a data processing network, such as a LAN and/or a WAN. The system 313 may also include a displayed unit 336 for connecting a displayed device (not shown) to the bus 312. CPU 310 may include other circuitry not shown herein, which will include circuitry commonly found within a microprocessor. System 313 may be used at each of the nodes discussed previously.

The communications adapter 334 is operable to receive data from the bus 312 and conform that data to a network protocol for transmission over the network 340. Such a protocol may be TCP/IP, NetBIOS, or a variety of other networking protocols which are common within the art. The communications adapter 334 has one or more addresses associated with it, which it can use to 'sign' outgoing packets or which it can use to determine if an incoming packet is intended for it. The communications adapter 334 may use 'aliasing' to simultaneously associate more than one address with that communications adapter 334. The data to be transmitted becomes the payload 216 previously discussed in reference to FIG. 2. The communications adapter 334 may also be operable to receive data from the network 340 and repackage or route that data as the payload 216 of an encapsulated packet.

Figure 4:
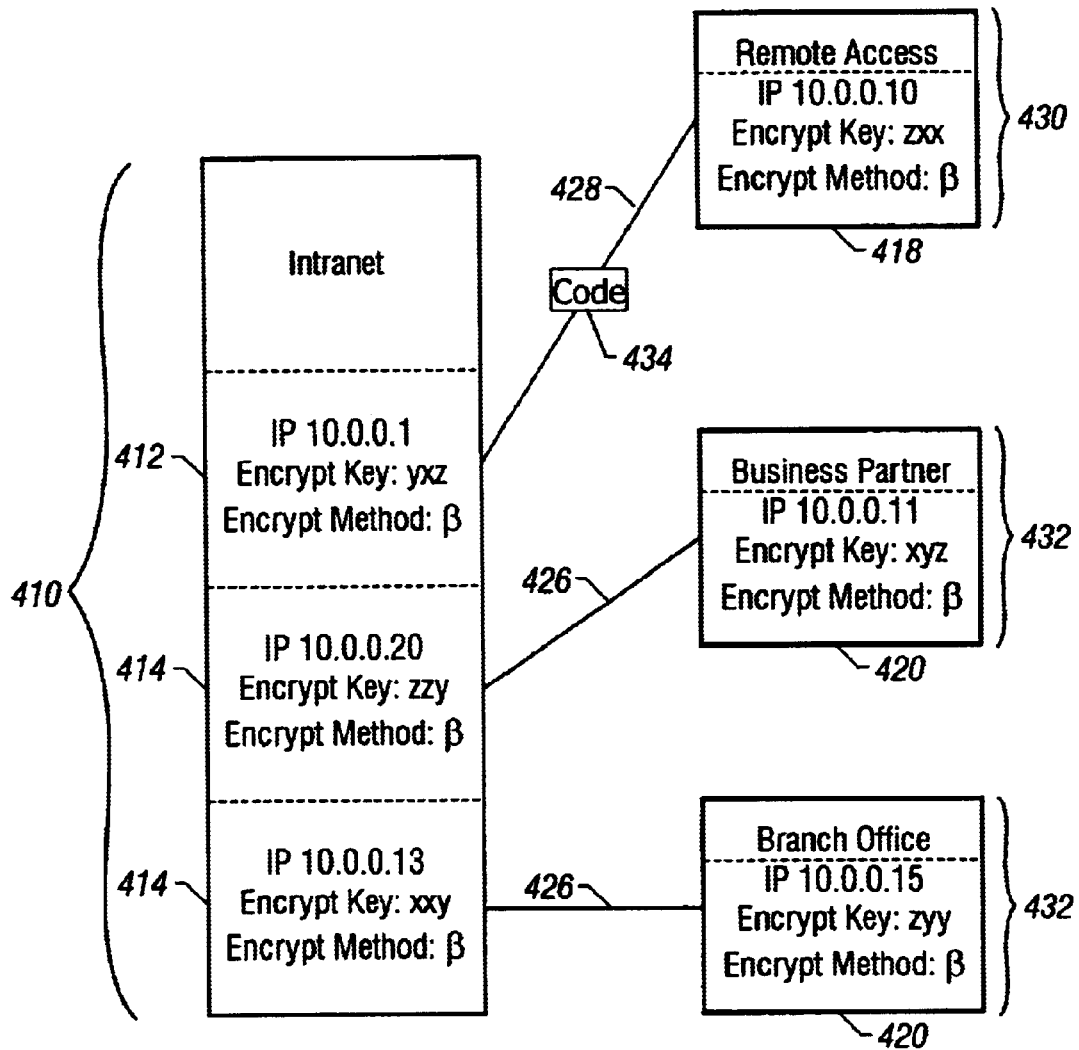
FIG. 4 is a diagram depicting the relationship of IP addresses, encryption keys, and encryption methods within a VPN system.

The operation of the present invention is demonstrated in FIG. 4. An intranet structure 410 may have several VPN tunnel connections 412, 414. Each VPN tunnel connection 412, 414, has associated with it an IP address 430, an encryption key 432, and an encryption method 434. As is well-appreciated in the art, the IP address 430 is a unique address within the Internet 116 depicted in FIG. 1.

The encryption key 432 and the encryption method 434 can be any number of keys or methods as defined in the computer encryption art. A variety of encryption methods are available utilizing a variety of different size encryption keys 432, such that each machine has its own encryption key 432. Keys of 128-bits are common. The encryption key 432, when applied using the encryption method 434, permits the intranet structure 410 to encrypt and decrypt packets sent and received. It will be appreciated that the instant invention operates independently of the encryption keys 432 and the encryption methods 434 so that any encryption method with any number of keys may be used with the instant invention.

FIG. 4 also depicts associate intranet structures 432, each of which have an associated IP address, encryption key, and encryption method defining VPN tunnel connections 420. Likewise, a remote access structure 430 also has associated with it a remote VPN tunnel connection 418 having the same configuration information. The associate VPN tunnel connections 420 and the VPN tunnel connections 414 define a VPN tunnel 428. Likewise, the remote VPN tunnel connection 418 and the VPN tunnel connection 412 define a VPN tunnel 428.

The instant invention involves the exchange of secondary VPN configuration information, such as the IP address, encryption key, and encryption method, between an intranet structure 410 and a remote access structure 430 or associate intranet structure 432 after a VPN tunnel 428, 426 has been established. The secondary configuration information exchanged is an additional one or more sets of configuration information. The secondary VPN configuration information may be exchanged by the system administrators over the VPN tunnels 428, 426 immediately after their creation while they are secure, or via out-of-band means such as secure telephone or facsimile transmission. Once exchanged, the secondary VPN configuration information for the remote access structure 430 may be stored by the intranet structure 410 or tracked by the system administrator. Likewise, the intranet's secondary VPN configuration information is stored on the remote access structure 430 or tracked by its system administrator.

In the event that either the intranet structure 410 or the remote access structure 430 detects snooping or other possible security breaches along the VPN tunnel 428, the detecting machine will alert its system administrator, who may send a predetermined administrative change code 434 to switch to the secondary VPN configuration. In the alternative, the system administrator may contact the remote access structure system administrator over a secure communication medium and arrange for a change at a predetermined time to the secondary VPN configuration.

Figure 8:
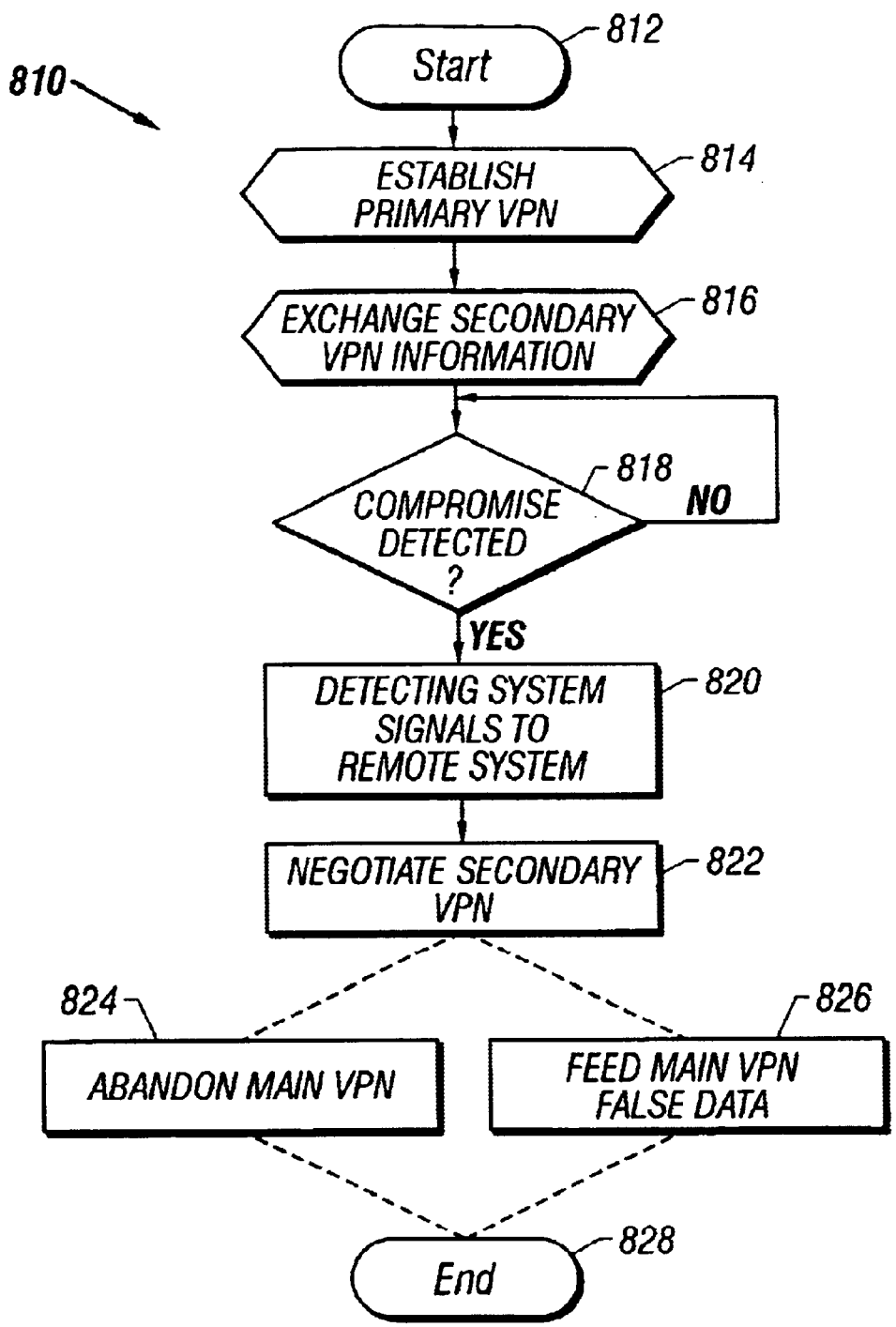
FIG. 8 is a flowchart diagram conforming to ANSI/ISO standard 5807-1985 describing the method of the present invention.

A embodiment of the method of the present invention is illustrated with reference to FIG. 8. A change algorithm 810 begins in step 812 with the precondition of a network system. A primary VPN tunnel is established in step 814 between two nodes of the network system. Then, the administrators at the nodes exchange in step 816 secondary VPN configuration information. Such exchange in step 816 can occur over the primary VPN tunnel previously established in step 814 or via out-of-network transfer (e.g. secure telephone or facsimile line). The algorithm 810 then waits until a compromise is detected in step 818. As previously noted, a compromise may be a security breach or a technical failure. Upon compromise, the detecting node administrator sends the administrative change code to the remote node in step 820. In the alternative, the detecting node administrator may call the remote node administrator to coordinate a change. Thereupon, both the detecting and remote nodes negotiate a secondary VPN tunnel in step 822.

Following establishment of the secondary VPN tunnel in step 822, the algorithm 810 may provide for either abandonment of the primary VPN tunnel in step 824 or for that primary VPN tunnel to be fed with false data in step 826. The algorithm may then be terminated in step 828, as shown, or, in an alternative embodiment, may loop to exchange additional VPN information step 816.

Figure 5:
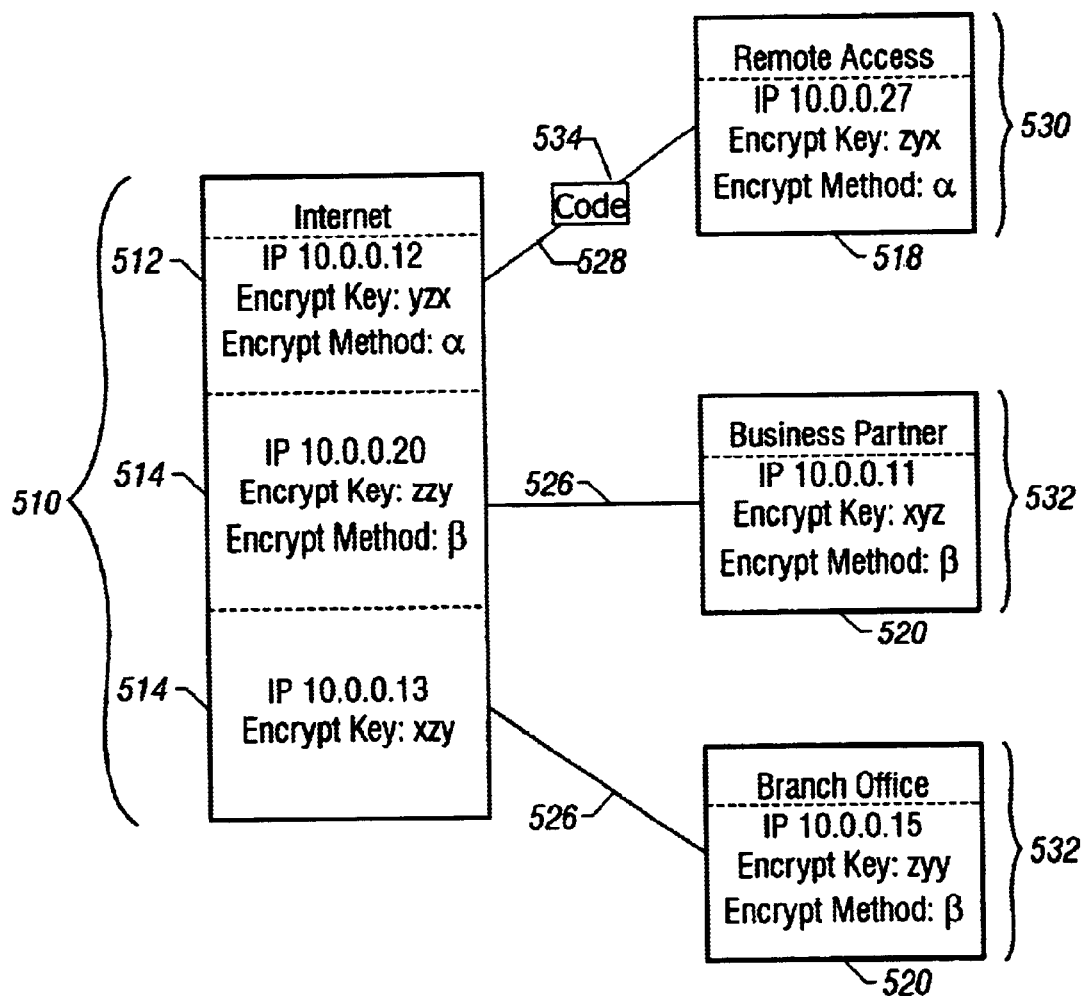
FIG. 5 is a diagram depicting the relationship of IP addresses, encryption keys, and encryption methods within a VPN system, demonstrating a change made to the VPN system by the instant invention.

FIG. 5 represents a possible result of such an administrative change code 534 being received by a remote access structure 530. A similar result may be had from a conference of the system administrators. The intranet structure 510 has reconfigured the end of a secondary VPN tunnel 528 in accordance with the secondary VPN configuration information 512. Likewise, the remote access structure 530 has reconfigured using its secondary VPN configuration information 518. As a result, the secondary VPN tunnel 528 now exists between two different IP addresses, utilizes different encryption keys, and utilizes a different encryption method.

Figure 7:
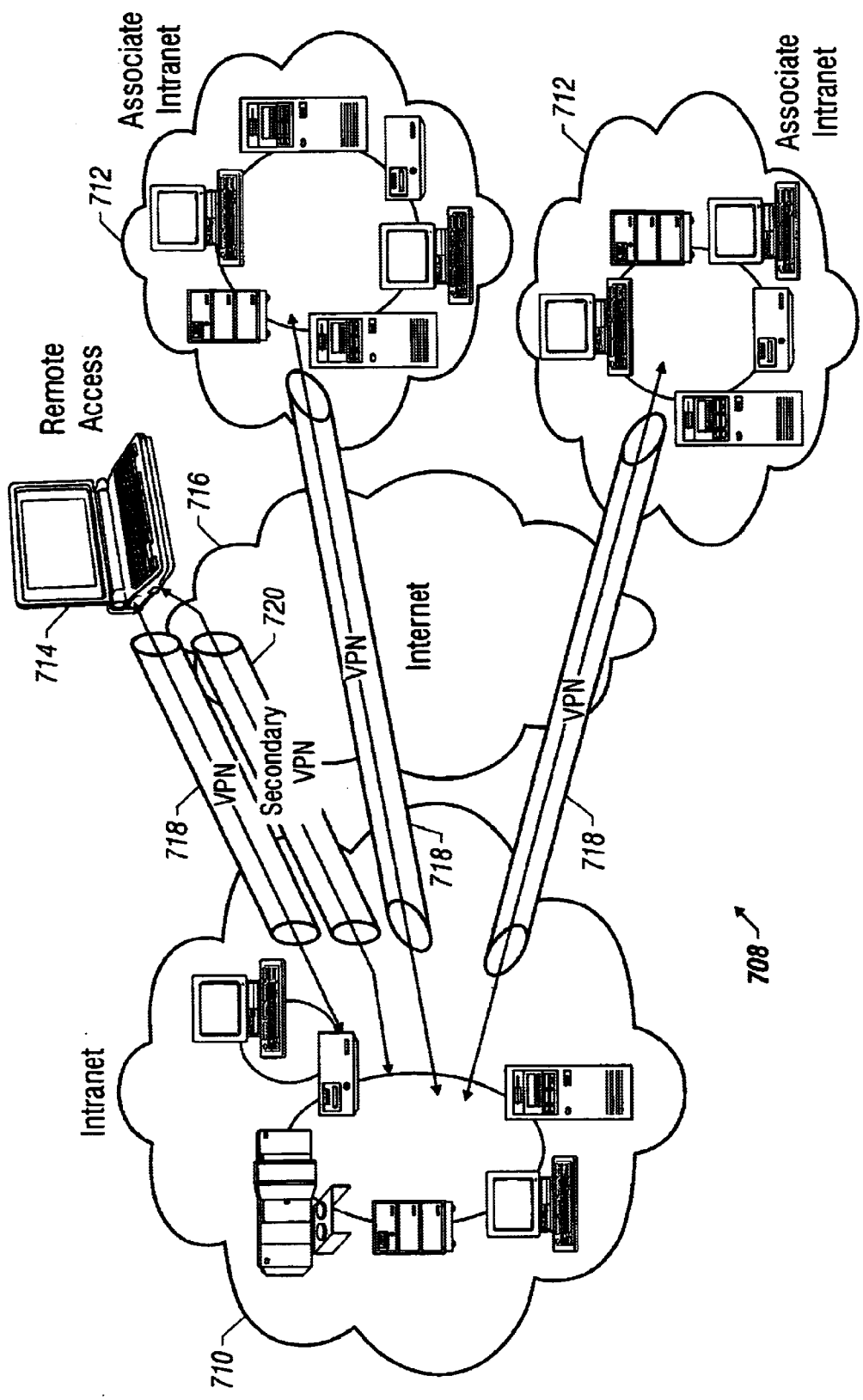
FIG. 7 is a system block diagram of a VPN network system with one of the nodes having a main and a secondary VPN tunnel in operation.

The secondary VPN tunnel 528 may be set up concurrently to the main VPN tunnel 428 by using the technique of address aliases, as is known in the art, to assign more than one address to the intranet structure 510 and the remote access structure 530. Such a configuration is demonstrated with reference to FIG. 7. FIG. 7 illustrates the layout of the VPN network system 708 after the secondary VPN tunnel 720 begins to operate. The original VPN tunnel 718 will still be active at this point in time. Due to its compromise, however, the original VPN tunnel 718 should not be used to communicate between the intranet 710 and the remote access machine 714. Upon establishing the secondary VPN tunnel 720, the original VPN tunnel 718 may be fed with false data. It will also be appreciated that a single VPN tunnel may be added without modifying other VPN tunnels within the same system 708.

In an alternative embodiment, the secondary VPN tunnel 528 may replace the main VPN tunnel 428 by replacing the main VPN configuration information with the secondary VPN configuration information. With either embodiment, any attempts to compromise the security of the main VPN tunnel 428 is stymied.

Figure 6A:
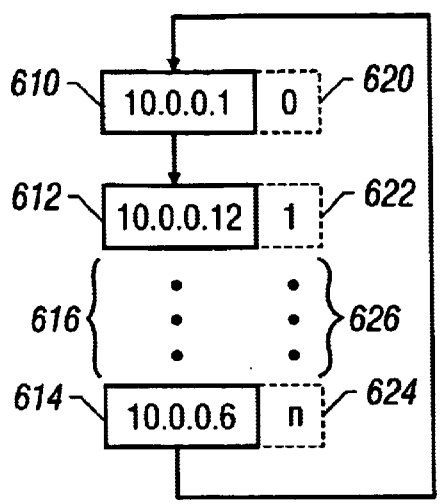
FIG. 6A is a diagram illustrating the rotation of use of a set of available IP addresses by the instant invention.

One possible algorithm for the administrator's selection of addresses is demonstrated by FIG. 6A. A main VPN address 610 may be ordered with a first secondary address 612, some number of additional secondary addresses 616, and a final secondary address 614. The main VPN address 610 has associated therewith a main VPN address code 620. Likewise, the first secondary address 612, the number of additional secondary addresses 616, and the final secondary address 614 also have associated therewith secondary address codes 622, 626, 624. Upon detection of a compromise, the administrator may simply send change code to change to the next address in order. For example, the first compromise will result in the address being changed from the main VPN address 610 to the first secondary address 612. The second compromise would cause the address to likewise shift down the ordered list of addresses until the final secondary address 614 is reached, at which time the next address selected would be the main VPN address 610 again.

In an alternate embodiment, the detecting machine's administrator may send a change code which specifies the main or secondary address code 620, 622, 626, 624 corresponding to the address to which to change. The address code specified may be determined randomly from the set of available address codes. As both nodes have the same associations of address codes to IP addresses, an identical change is made to the corresponding IP address 610, 612, 616, 614 at each node.

In a second alternate embodiment, the detecting machine's administrator may contact the other node's administrator via secure telephone or facsimile to specify the secondary IP address verbally.

Figure 6B:
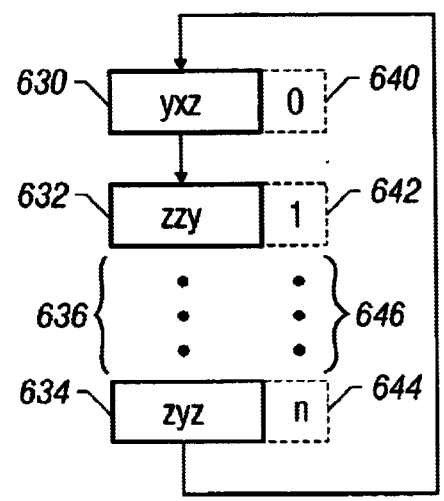
FIG. 6B is a diagram illustrating the rotation of use of a set of available encryption keys by the instant invention.
Figure 6C:
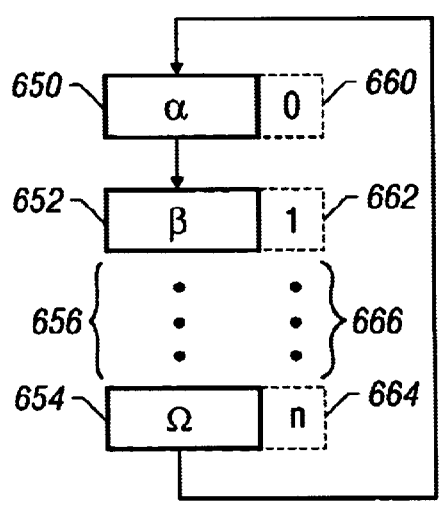
FIG. 6C is a diagram illustrating the rotation of use of a set of available encryption algorithms by the instant invention.

It will be appreciated that each of these types of algorithms may be used to select from a set of useable encryption keys or encryption algorithms, as indicated in FIG. 6B and FIG. 6C, respectively.

It should be appreciated that not all configuration aspects of the changing VPN tunnel 528 need change. For example, the addresses may be changed, leaving the encryption keys and methods the same. However, maximum security benefit will be achieved if all configuration data for the secondary VPN tunnel 528 is different from that of the main VPN tunnel 428. It will further be appreciated that the entire operation of this invention may be repeated each time a security breach is detected. The secondary VPN tunnel 528 may then yield to a tertiary VPN tunnel, and so on, to insure security is maintained. In an alternative embodiment of the invention, the secondary VPN tunnel 528 is established concurrently with the original VPN tunnel 428 upon the initial negotiation of the original VPN tunnel 428. The secondary VPN tunnel 528, however, is unused until such time as a breach of security is detected. Such an embodiment can reduce the amount of time it takes for the system administrators at the respective nodes to confer with new configuration data. Accordingly, a switch from the original VPN tunnel 428 to the secondary VPN tunnel 528 may be made more quickly. However, in this embodiment there is a slight risk that the secondary VPN tunnel 428 may be compromised during its negotiation, thus decreasing the security benefit of this embodiment.

As to the manner of operation and use of the present invention, the same is made apparent from the foregoing discussion. With respect to the above description, it is to be realized that although embodiments of specific material are disclosed, those enabling embodiments are illustrative, and the optimum relationships for the parts of the invention are to include variations in composition, form, function, configuration, and manner of operation, which are deemed readily apparent to one skilled in the art in view of this disclosure. All equivalent relationships to those illustrated in the drawings encompassed in this specification are intended to be encompassed by the present invention.

Therefore, the foregoing is considered as illustrative of the principals of the invention and since numerous modifications will readily occur to those skilled in the art, it is not desired to limit the invention to the exact construction and operation shown or described, and all suitable modifications and equivalants may be resorted to, falling within the scope of the invention.

What is claimed is:

1. A tunneled networking system comprising:
   a first tunneled node having a first administrator, a first set of tunneling configuration data and at least one first set of backup configuration data associated therewith;
   a second tunneled node having a second administrator, a second set of tunneling configuration data and at least one second set of backup configuration data associated therewith; and
   a tunneled network between the first tunneled node and the second tunneled node,
   wherein the first tunneled node is operable to begin using the first set of backup configuration data to negotiate a backup tunneled network system with the second tunneled node upon direction of the first administrator wherein the first administrator is in communication with the second administrator, and
   wherein the second tunneled node is operable to begin using the second set of backup configuration data to negotiate the backup tunneled network with the first tunneled node upon direction of the second administrator.

2. The tunneled networking system of claim 1 wherein the first tunneled node is further operable to detect compromises of the tunneled network and alert the first administrator upon detection of a compromise of the tunneled network.

3. The tunneled networking system of claim 2 wherein the compromise is a security compromise.

4. The tunneled network system of claim 3 wherein the first tunneled node is operable to abandon the network tunnel after establishing the backup tunneled network system, and
   the second tunneled node is operable to abandon the network tunnel after establishing the backup tunneled network system.

5. The tunneled network system of claim 3 wherein the first tunneled node is operable to send false data over the network tunnel after establishing the backup tunneled network system, and
   the second tunneled node is operable to send false data over the network tunnel after establishing the backup tunneled network system.

6. The tunneled networking system of claim 2 wherein the first administrator is in communication with the second administrator using a secured communication path.

7. The tunneled networking system of claim 6 wherein the first set of networking configuration data is comprised of a source address, a destination address, at least one first encryption key, and an encryption method, and
   wherein the second set of networking configuration data is comprised of the source address, the destination address, at least one second encryption key, and the encryption method.

8. The tunneled network system of claim 6 wherein the secured communication path is not electrically connected to the tunneled network system.

9. In a tunneled network system having a first tunneled node and a second tunneled node, a method comprising the steps of:
   associating a first set of tunneling configuration data and at least one first set of backup configuration data with the first tunneled node;
   associating a second set of tunneling configuration data and at least one second set of backup configuration data with the second tunneled node; and
   the first tunneled node and the second tunneled node negotiating a second tunneled network system using the first set of backup configuration data and the second set of backup configuration data.

10. The method of claim 9 further comprising the steps of:
   detecting at the first tunneled node a breach or potential breach of security within the tunneled network system; and
   the first tunneled node alerting the second tunneled node to the breach.

11. The method of claim 10 further comprising the steps of:
   the first tunneled node sending false data over the network tunnel after detecting a breach; and
   the second tunneled node sending false data over the network tunnel after a breach is detected at the first tunneled node.

12. The method of claim 9 further comprising the step of the second tunneled node acknowledging to the first tunneled node prior to negotiating the second tunneled network system.

13. The method of claim 9 further comprising the steps of:
   the first tunneled node abandoning the network tunnel; and
   the second tunneled node abandoning the network tunnel.

14. A tunneled networking system comprising
   a first tunneled node having a first administrator, a first set of tunneling configuration data and at least one first set of backup configuration data associated therewith;
   a second tunneled node having a second administrator, a second set of tunneling configuration data and at least one second set of backup configuration data associated therewith;
   a main network tunnel between the first tunneled node and the second tunneled node associated with the first set of tunneling configuration data and the second set of tunneling configuration data; and
   at least one backup tunnel between the first tunnel node and the second tunneled node associated with the first set of backup configuration data and the second set of backup configuration data,
   wherein the first tunneled node is operable to begin using the backup network tunnel to communicate with the second tunneled node at the first administrator's direction,
   wherein the first administrator is in communication with the second administrator, and
   wherein the second tunneled node is operable to begin using the backup network tunnel to communicate with the first tunneled node at the second administrator's direction.

15. The tunneled networking system of claim 14 wherein the first tunneled node is further operable to detect compromises of the main network tunnel and alert the first administrator upon detection of a compromise of the main network tunnel.

16. The tunneled networking system of claim 15 wherein the compromise is a security compromise.

17. The tunneled networking system of claim 15 wherein the first administrator is in communication with the second administrator using a secured communications path.

18. The tunneled networking system of claim 17 wherein the first set of networking configuration data is comprised of a source address, a destination address, at least one first encryption key, and an encryption method, and
   wherein the second set of networking configuration data is comprised of the source address, the destination address, at least one second encryption key, and the encryption method.

19. The tunneled network system of claim 17 wherein the first tunneled node is operable to abandon the main network tunnel after detecting a compromise of the main network tunnel, and
   the second tunneled node is operable to abandon the main network tunnel after beginning to use the backup network tunnel.

20. The tunneled network system of claim 17 wherein the first tunneled node is operable to send false data over the main network tunnel at the first administrator's direction after detecting a compromise of the main network tunnel, and
   the second tunneled node is operable to send false data over the main network tunnel after beginning to use the backup network tunnel.

21. The tunneled network system of claim 17 further comprising:
   at least one additional tunneled node having an additional administrator, an additional set of tunneling configuration data and at least one additional set of backup configuration data associated therewith,
   wherein the main network tunnel further connects the first tunneled node and the second tunneled node to the additional tunneled node,
   wherein the backup network tunnel further connects the first tunneled node and the second tunneled node to the additional tunneled node,
   wherein the additional administrator is in communication with the first administrator and the second administrator, and
   the additional tunneled node being operable to begin using backup network tunnel to communicate with the first tunneled node and the second tunneled node upon direction of the additional administrator.

22. A node to a tunneled networking system comprising:
   a set of tunneling configuration data;
   at least one set of backup configuration data; and
   a tunneled network endpoint,
   wherein the node is operable to begin using the set of backup configuration data to create a backup tunneled network endpoint upon direction of an administrator.

23. The node of claim 22 wherein the node is operable to detect compromises at the tunneled network endpoint and alert the administrator upon detection of a compromise.

24. The node of claim 23 wherein the compromise is a security compromise.

25. The node of claim 23 wherein the administrator is in communication with a second administrator using a secured communication path.

26. The tunneled network system of claim 25 wherein the secured communication path is not electrically connected to the node.

27. The node of claim 23 wherein the set of tunneling configuration data is comprised of a source address, a destination address, at least one first encryption key, and an encryption method.

28. The node of claim 23 wherein the node is operable to abandon the tunneled network endpoint after establishing the backup tunneled network endpoint.

29. The node of claim 23 wherein the node is operable to send false data out the tunneled network endpoint after establishing the backup tunneled network endpoint.

30. A computer-readable medium having stored thereon a computer program comprising:
- a configuration storage code comprising a set of codes operable to direct a node to store a set of tunneling configuration data;
- a backup configuration storage code comprising a set of codes operable to direct the node to store a set of backup tunneling configuration data;
- a tunneled network endpoint code comprising a set of codes operable to direct the node to set up a tunneled network endpoint using the set of tunneling configuration data; and
- a switching code comprising a set of codes operable to direct the node to set up a backup tunneled network endpoint using the set of backup tunneling configuration data upon command of an administrator.

31. The computer-readable medium of claim 30 additionally having stored therein a computer program comprising:
- a detection code comprising a set of codes operable to direct the node to detect a compromise of the tunneled network endpoint; and
- an alert code comprising a set of codes operable to direct the node to alert the administrator to the compromise.

32. The computer-readable medium of claim 31 wherein the set of tunneling configuration data is comprised of a source address, a destination address, at least one first encryption key, and an encryption method.

33. The computer-readable medium of claim 31 wherein the compromise is a security compromise.

34. The computer-readable medium of claim 31 wherein the switching code is further operable to direct the node to abandon the tunneled network endpoint after establishing the backup tunneled network endpoint.

35. The computer-readable medium of claim 31 wherein the switching code is further operable to direct the node to send false data out of the tunneled network endpoint after establishing the backup tunneled network endpoint.

* * * * *